Patented Apr. 24, 1951

2,550,557

UNITED STATES PATENT OFFICE 2,550,557

PROCESS FOR TREATING POLYMERIZED TERPENE RESIN

Burt L. Hampton, De Ridder, La., assignor to Crosby Chemicals, Inc., De Ridder, La., a corporation of Mississippi No Drawing. Application July 15, 1949, Serial No. 105,073

10 Claims. (Cl. 260—93.3)

The present invention relates to improvements in treating polymers of terpenes for enhancing resistance to oxidation thereof with accompanying decolorization.

It is well-known that terpenes will polymerize to form many types of compounds which range from liquid, oily products to solid, resinous products. These products, particularly the solid resins, find many industrial applications, but suffer from the tendency to oxidize slowly in the air, such oxidation producing changes in properties of the resins that cause embrittlement of the resins and deterioration of color.

Since the solid resinous products are industrially the most important of the terpene polymers, the conditions of the polymerization reaction are controlled as to solvents employed, catalyst and reaction temperatures. The starting terpenes employed for producing solid polymers are dipentene, alpha-pinene, beta-pinene or mixtures thereof, the polymerization being carried out in the presence of a Friedel-Crafts catalyst such as aluminum chloride, boron trifluoride, or other catalysts employed in the Friedel-Crafts reaction, as is well-known in the art. The choice of catalyst, solvent and reaction temperatures determines the characteristics of the resulting solid reaction products, which, however, are susceptible to oxidation with loss of desirable properties, as has been pointed out above. This oxidation apparently results from residual unsaturation resulting from the fact that the products are obtained from unsaturated cyclic terpenes.

In accordance with the present invention, it has been discovered that this atmospheric oxidation can be greatly decreased, with attendant substantially improved color and stability, by treating the said solid polymerizaion product with catalytic amounts of selenium, at elevated temperatures, it being preferred to carry out the reaction at temperatures above the melting point of the polymerized product, although a solvent for the resin, such as acetone, xylol, or the like, may be employed, in which event, a closed system under super-atmospheric pressure is used if the solvent for the resin has a low boiling point, in order to attain reaction temperature. The amount of selenium catalyst, the temperature and the time of heating are correlated and controlled, as will be evidenced by the following specific examples of the process, so as to result in an appreciable decrease in unsaturation of the polymer, as determined by the thiocyanogen value.

The process will be understood from the following specific illustrative examples, which show the specific operation of the process as applied to solid resinous polymerization products of unsatured cyclic terpenes:

Example I

Two hundred parts by weight of a solid dipentene polymer having a color of 1.0 Red, 12 Yellow on the Lovibond color scale, a ring and ball melting point of 105° C., and a thiocyanogen value of 28 were heated with 0.02 part by weight of selenium at approximately 280° C., for two hours, in an atmosphere of carbon dioxide. At the end of the reaction period, the resin was steamed gently while the temperature dropped to 230° C. The purpose of the steaming is to remove the light oils formed in the reaction which lower the melting point of the resin somewhat and to remove malodorous materials formed by the reaction of the selenium on the resin. The yield of treated resin was 97.5%, and it had a color of 0.5 Red and 7 Yellow on the Lovibond color scale, a melting point of 108° C. by ring and ball measurement, and a thiocyanogen value of 21.

Example II

Two hundred parts by weight of the original resin employed in Example I were heated to 200° C. under an atmosphere of carbon dioxide. At this temperature, 0.4 part of powdered selenium was added and the temperature was held at 200° C. for five hours. Steaming then was carried out as described in Example I. The yield was 99.0%. The selenium treated resin had a Lovibond color of 0.7 Red, 8 Yellow, a ring and ball melting point of 105.5° C., and a thiocyanogen value of 20.

Example III

Two hundred parts of the original resin used in Example I were heated to about 200° C. under an atmosphere of carbon dioxide and 0.4 part of selenium was added. The temperature was raised rapidly to 330° C. and held there for fifteen minutes. Steaming then was carried out as described in Example I. The yield of treated resin was 96.5%. The selenium-treated resin had a Lovibond color of 0.7 Red, 7 Yellow, a ring and ball melting point of 99° C., and a thiocyanogen value of 16.

Example IV

Two hundred parts of the original resin used in Example I were heated to around 200° C. under an atmosphere of carbon dioxide and 0.6 part of selenium added. The temperature then was raised rapidly to 240° C. and held there for four hours. Steaming then was carried out as described in Example I. The yield was 99%. The selenium-treated resin had a Lovibond color of 0.1 Red, 3 Yellow, a ring and ball melting point of 108° C., and a thiocyanogen value of 19.

Example V

Two hundred parts of the original resin used in Example I were treated to about 200° C. in an atmosphere of carbon dioxide and 2.0 parts of selenium powder were added. The temperature then was raised rapidly to 280° C. and held at this point for three hours. The resin then was steamed gently as described in Example I. The Lovibond color of the selenium-treated resin was 0.3 Red, 3 Yellow on the Lovibond scale, the ring and ball melting point was 105° C., and the thiocyanogen value was 19. The yield of treated resin was 98%.

Example VI

Two hundred parts of the original resin used in Example I were heated to about 200° C. under an atmosphere of carbon dioxide and ten parts by weight of selenium powder were added. The temperature then was raised rapidly to 280° C. and held there for four hours. The resin then was steamed gently as described in Example I. The yield of treated resin was 97.5%. The Lovibond color of the treated resin was 1.6 Red, 13 Yellow, the ring and ball melting point was 105° C., and the thiocyanogen value 11.

Example VII

Two hundred parts by weight of the original resin used in Example I were heated to approximately 200° C. in an atmosphere of carbon dioxide, and one part by weight of selenium powder was added. The temperature then was raised rapidly to approximately 280° C. and held there for two and one-half hours. The resin then was steamed gently as described in Example I. The selenium-treated resin had a Lovibond color of 0.5 Red, 5 Yellow, a thiocyanogen value of 22, and a ring and ball melting point of 108° C. The yield was 97%.

Example VIII

A mixture composed of 25% beta-pinene and 75% dipentene was polymerized, using aluminum chloride as catalyst, to a solid resinous polymer. One hundred and thirty-four parts by weight of this polymerized resin having a ring and ball melting point of 122.5° C., a Lovibond color of 0.5 Red and 11 Yellow, and a thiocyanogen value of 36.3, were heated to about 200° C. in an atmosphere of carbon dioxide and 0.27 part by weight of selenium powder was added. The temperature then was raised rapidly to approximately 280° C. and held there for three hours. The treated resin was steamed as in Example I. The yield was 95.5%. The Lovibond color value of the selenium-treated resin was 0.2 Red, 5 Yellow, the ring and ball melting point was 113° C., and the thiocyanogen value was 29.

Example IX

Alpha-pinene was polymerized to a solid resin polymer, using aluminum chloride as catalyst. The resulting resin had a Lovibond color of 3.5 Red, 40 Yellow, a ring and ball melting point of 80° C., and a thiocyanogen value of 95. Two hundred and ninety-three parts by weight of this solid resin were heated to approximately 200° C. in an atmosphere of carbon dioxide and 0.88 part of weight of selenium powder was added. The temperature then was raised rapidly to 280° C. and held there for two and one-half hours. The resin was then steamed as in Example I. The selenium-treated resin had a Lovibond color of 0.7 Red, 6 Yellow, a ring and ball melting point of 77° C., a thiocyanogen value of 68, and the yield was 94%.

Example X

Three hundred and eighty-two parts by weight of resin designated by the trade name of Piccolyte-S-100, which is a commercial terpene resin produced from terpenes consisting preponderatingly of beta-pinene, having a Lovibond color value of 1.6 Red, 18 Yellow, a ring and ball melting point of 101° C., and a thiocyanogen value of 61, were heated to approximately 200° C. under an atmosphere of carbon dioxide, and 0.56 part by weight of selenium powder was added. The temperature then was raised rapidly to 280° C. and maintained there for three hours. The resin then was steamed as described in Example I. The Lovibond color of the selenium-treated resin was 0.7 Red, 14 Yellow, the ring and ball melting point was 85° C., the thiocyanogen value was 39, and the yield was 95%.

In operating the process, any inert gas may be used as the blanketing atmosphere, although carbon dioxide was used in the foregoing examples because of its availability. However, other inert gases such as nitrogen or helium may be employed, the choice of the inert atmosphere being left to the operator. The solid terpene resins preferably are heated to above their melting points under a blanket of inert gas as an atmosphere and the selenium is added as a powder. The temperature of the reaction system is increased to a point where the reaction proceeds smoothly at a practicable rate, the inert atmosphere being maintained in the reaction environment until the reaction is complete, which is found in practice to be preferably approximately one to four hours. When the reaction is complete, the heated resin is recovered by any suitable method as is apparent. It is found that the selenium treatment effects a substantial decrease in the apparent unsaturation of the terpene resin polymers, as manifested by decreased thiocyanogen values, and an upgrading of color, as shown by the Lovibond color values, the selenium-treated resins being stable, highly resistant to oxidation, and pale in color.

The desirable results of the invention are obtained by using 0.01% to 5% of selenium, based on the weight of resin, the more preferable range being from approximately, for example, 0.1% to 1%, and the optimum range being from 0.1% to 0.6% selenium, based on the weight of the resin. Using amounts of selenium in the more preferable and optimum ranges, the maximum amount of stabilization and decolorization are effected, while increasing the amount of selenium to the higher values, for example, around 5%, minimizes the decolorizing action, owing to the colorizing effects of the selenium, although a high degree of stabilization (resistance to oxidation) is obtained. The addition of selenium may be made at any time, either while the resin is solid or when the resin has been melted and heated to the temperature desired for the reaction. The selenium may be employed either in the free (elemental) state or combined such as in the form of selenium dioxide which reacts with the resin to precipitate collodial selenium which gives the above stabilizing and decolorizing action. The steaming treatment employed at the end of the reaction sweeps out last traces of inert gas and gaseous reaction products, including vaporized selenium. However, the steaming step may be omitted if no regard is had for the melting point and odor of the resulting resin.

The reaction temperatures as well as reaction times employed are subject to wide variations, depending upon the properties desired in the final product. The treatment may be carried out at a temperature ranging anywhere from approximately 200° C. to approximately 360° C., although temperatures between approximately 230° C. and approximately 310° C. are preferable. Generally speaking, the temperature and time of reaction are correlated; the higher the temperature, the shorter the time required for treatment. The reaction times vary anywhere from one-tenth hour (six minutes) to twenty-five hours, although a reaction time of from approximately one to approximately four hours is found to be preferable.

The reaction of the resin with the selenium appears to be a dehydrogenation reaction coupled with a small amount of hydrogenation and disproportionation. The selenium removes hydrogen from the resin molecules, forming hydrogen selenide, which, however, is unstable at the reaction temperatures, decomposing into hydrogen and selenium, the latter being free to exhaust more hydrogen from the resin.

The marked improvement in color imparted to the resins by the process of the present invention, that is to say, the marked and unexpected decolorizing action of the selenium, makes the resins highly useful in the manufacture of varnishes, paints, enamels, adhesives, and printing inks, the paleness of the treated resins, as well as the stability thereof, making these resins more desirable for such uses than other materials customarily employed for similar purposes and available at lower cost than have been the terpene resin polymers. Thus, these treated resins are brought to at least a competitive level with such other materials, and are free from objectionable embrittlement and impaired color to which the untreated resins, and many other competitive materials, are subject upon atmospheric aging.

I claim:

1. A process of decolorizing solid cyclic terpene polymers derived from polymerizable cyclic terpenes, which comprises reacting in molten condition, a normally solid cyclic terpene polymer derived from polymerizable cyclic terpenes with catalytic amounts of about 0.01% to 5% of selenium in an inert atmosphere at a reaction temperature of from approximately 200° C. to approximately 360° C. by contacting the said cyclic terpene polymer with the selenium until substantial decolorization of the said cyclic terpene polymer is effected.

2. A process of decolorizing solid cyclic terpene polymers derived from polymerizable cyclic terpenes, which comprises reacting in molten condition, a normally solid cyclic terpene polymer derived from polymerizable cyclic terpenes with from approximately 0.01% to approximately 5% of selenium based on the weight of the said cyclic polymer, at a reaction temperature of from approximately 200° C. to approximately 360° C. by contacting the said cyclic polymer in an inert atmosphere with the selenium until substantial decolorization of the said cyclic polymer is effected, and then steaming the treated cyclic polymer until light oils and malodorous reaction products are removed.

3. A process of decolorizing solid cyclic terpene polymers derived from polymerizable cyclic terpenes, which comprises reacting in molten condition, a normally solid cyclic terpene polymer derived from polymerizable cyclic terpenes with from approximately 0.1% to approximately 1% of selenium based on the weight of the said cyclic terpene polymer, at a temperature of from approximately 230° C. to approximately 310° C. for a reaction time of from approximately 15 minutes to approximately 5 hours and then steaming the treated cyclic terpene polymer until light oils and malodorous reaction products are removed.

4. A process of decolorizing solid cyclic terpene polymers derived from polymerizable cyclic terpenes, which comprises reacting in molten condition, a normally solid cyclic terpene polymer derived from polymerizable cyclic terpenes with approximately 0.1% to 0.6% selenium based on the weight of the said cyclic terpene polymer at a temperature of approximately 230° C. to approximately 310° C. for a reaction time of from one hour to four hours until substantial decolorization is effected, the reaction being carried out in an inert atmosphere.

5. A process of decolorizing solid cyclic terpene polymers derived from polymerizable cyclic terpenes, which comprises reacting in molten condition, a normally solid cyclic terpene polymer derived from polymerizable cyclic terpenes with from approximately 0.1% to 0.6% selenium based on the weight of the said cyclic terpene polymer at a temperature of approximately 230° C. to approximately 310° C. for a reaction time of from one hour to approximately four hours until substantial decolorization of the said cyclic terpene polymer is effected, and then steaming the resulting selenium-treated cyclic terpene polymer until light oils and malodorous reaction products are completely removed from the reaction environment.

6. A process of decolorizing solid cyclic terpene polymers derived from polymerizable cyclic terpenes, which comprises reacting in molten condition, a normally solid cyclic terpene polymer derived from polymerizable cyclic terpenes with from approximately 0.1% to approximately 0.6% of selenium based on the weight of the said cyclic terpene polymer at a temperature of from approximately 230° C. to approximately 310° C. for a reaction time of from approximately one hour to approximately four hours until substantial decolorization is effected, the reaction being carried out in an inert atmosphere, the selenium being introduced into the said cyclic terpene polymer by reduction from selenium dioxide in contact with the said cyclic terpene polymer.

7. The process of decolorizing a solid cyclic terpene polymer derived from polymerizable cyclic terpenes, which comprises contacting the said polymer with from approximately 0.01% to approximately 5% selenium, based on the weight of the said polymer, at a temperature between about 200° C. and 360° C., and then steaming to remove odoriferous reaction materials and light oil reaction products.

8. The process of decolorizing a solid cyclic terpene polymer derived from polymerizable cyclic terpenes, which comprises contacting the said polymer with about 0.1% to about 1% selenium, based on the weight of the said polymer, at a temperature between approximately 230° C. and approximately 310° C., and then steaming to remove odoriferous reaction materials and light oil reaction products.

9. The process of decolorizing solid cyclic terpene polymers derived from polymerizable cyclic terpenes, which comprises reacting in molten condition, a normally solid cyclic terpene polymer consisting of a polymer selected from the group consisting of a solid dipentene polymer, a beta-pinene polymer and an alpha-pinene polymer, with catalytic amounts of selenium in an inert atmosphere at a reaction temperature of from approximately 200° C. to approximately 360° C. by contacting the said polymer with the selenium until substantial decolorization of the said polymer is effected.

10. The process of decolorizing solid cyclic terpene polymers derived from polymerizable cyclic terpenes, which comprises reacting in molten condition, a normally solid cyclic terpene polymer consisting essentially of a copolymer of dipentene with beta-pinene and alpha-pinene, with catalytic amounts of selenium in an inert atmosphere at a reaction temperature of from approximately 200° C. to approximately 360° C. by contacting the said mixture with the selenium until substantial decolorization of the said mixture is effected.

BURT L. HAMPTON.

REFERENCES CITED

The following references are of record in the file of this patent:

UNITED STATES PATENTS

| Number | Name | Date |
|---|---|---|
| 2,449,970 | Borglin | Sept. 28, 1948 |
| 2,492,145 | Hampton | Dec. 27, 1949 |
| 2,492,146 | Hampton | Dec. 27, 1949 |